United States Patent [19]

Schamblin

[11] Patent Number: 4,713,732
[45] Date of Patent: Dec. 15, 1987

[54] VEHICLE WARNING SYSTEM

[76] Inventor: Charles Schamblin, 1714 S. "M" St., Bakersfield, Calif. 93304

[21] Appl. No.: 870,941

[22] Filed: Jun. 5, 1986

[51] Int. Cl.$^4$ .............................................. B60Q 1/00
[52] U.S. Cl. ..................................... 362/61; 362/287; 340/87; 350/97
[58] Field of Search ................... 362/61, 80, 285, 287, 362/320, 288; 340/84, 87, 97, 99, 135; 350/97

[56] References Cited

U.S. PATENT DOCUMENTS

| | | | |
|---|---|---|---|
| 1,254,242 | 11/1918 | Lambert | 340/87 |
| 2,237,536 | 4/1941 | Wells | 340/87 |
| 3,895,348 | 7/1975 | Palermo | 340/87 |
| 4,052,697 | 10/1977 | Daifotes | 340/87 |
| 4,201,975 | 5/1980 | Marcus | 340/87 |

Primary Examiner—William A. Cuchlinski, Jr.
Assistant Examiner—D. M. Cox
Attorney, Agent, or Firm—John J. Posta, Jr.

[57] ABSTRACT

The vehicle warning system is adapted to be mounted on the rear window shelf of a vehicle or at the front exterior of a vehicle. It includes a light source such as an incandescent lamp, an L.E.D. display or the like electrically powered by portable dry cells, a vehicle battery or the like, and a flexible, resilient, light reflective sheet, preferably bearing light reflective beads, etc., which sheet is secured by one or more support members directly adjacent to that light source so that vehicle vibrations and/or wind during vehicle travel will flutter the sheet in various directions and flash the light from the light source as a warning to pedestrians, bicyclists and motorists. The support member(s) can be rigid or flexible, resilient and spring-like to aid in the sheet fluttering. The sheet can be reflective on opposite sides and can be positioned at about the transverse midline of the light source in a support bracket for mounting in the rear window shelf so as to be readily viewable from both the front and rear. The system is inexpensive, durable and effective.

10 Claims, 6 Drawing Figures

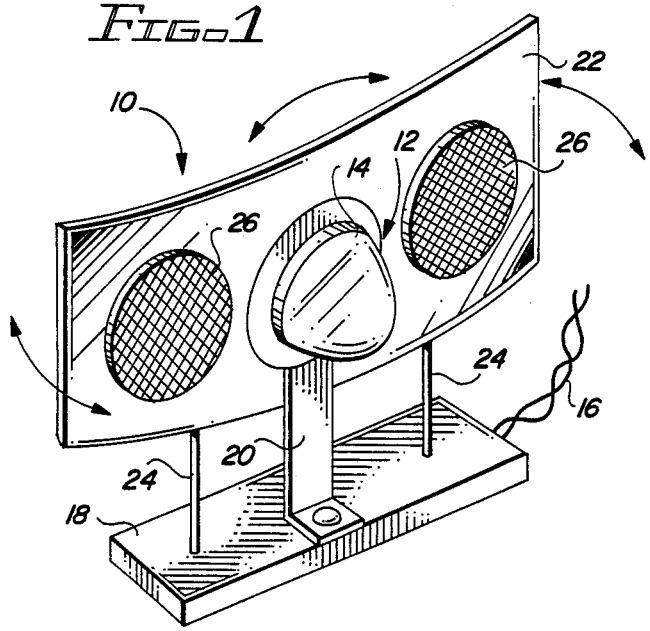
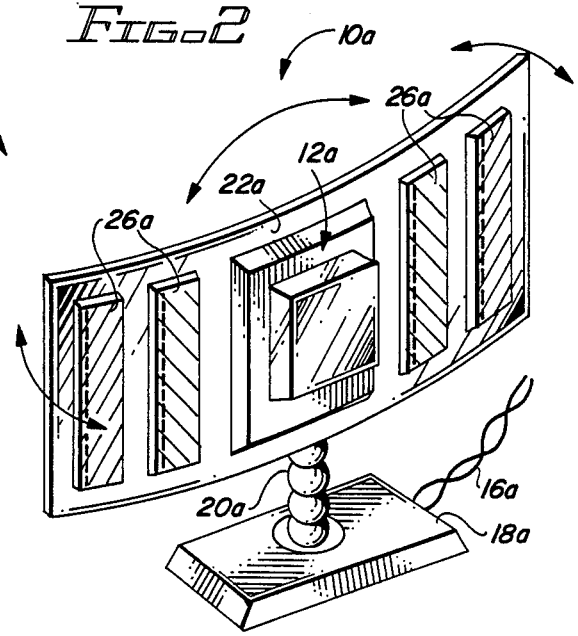
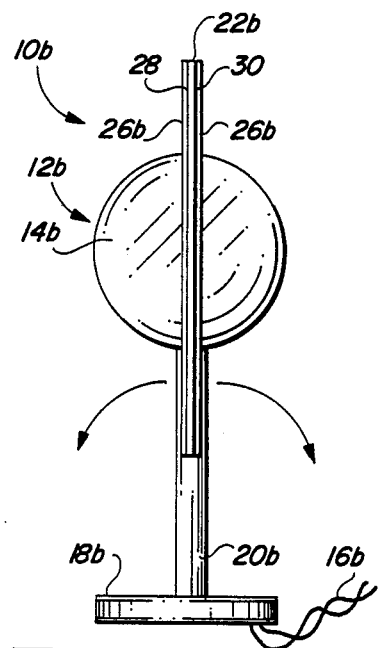
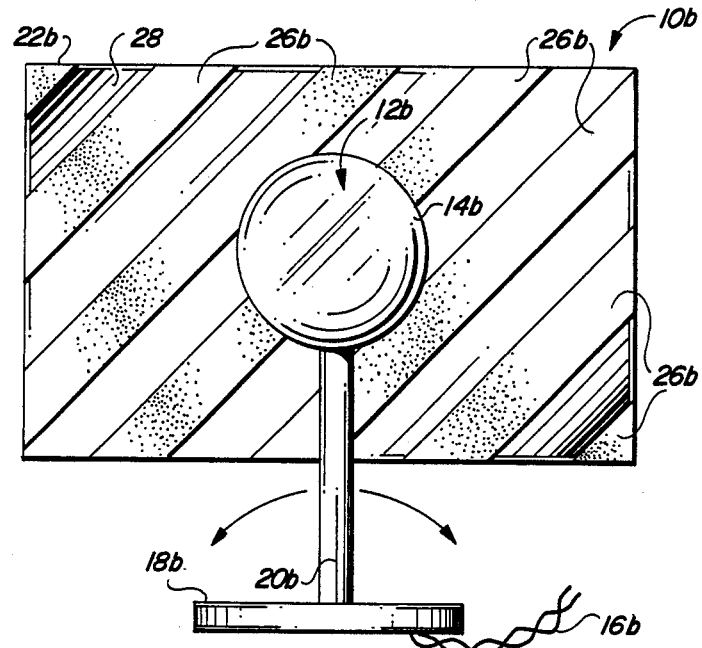
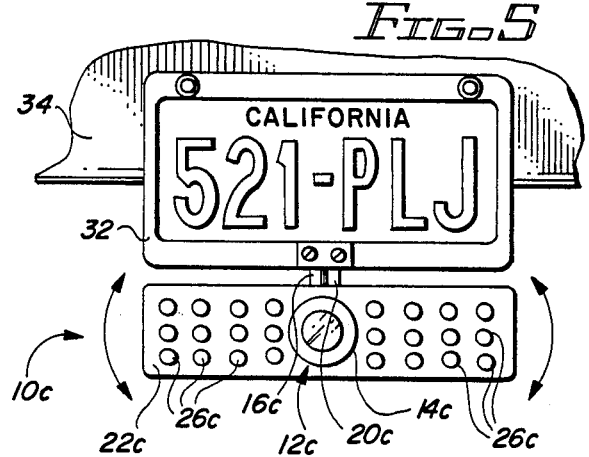
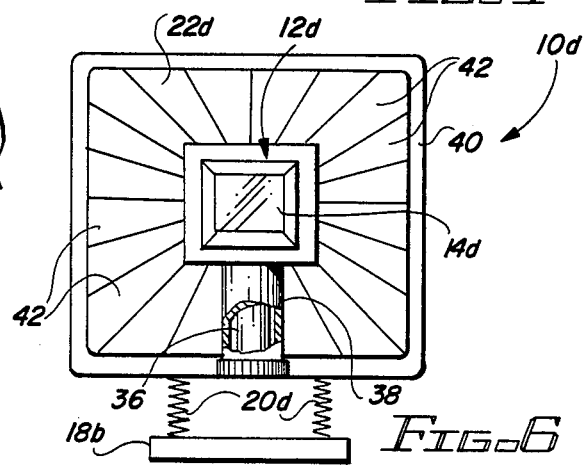

VEHICLE WARNING SYSTEM

BACKGROUND OF THE INVENTION

1. Field of the Invention

The present invention generally relates to warning systems and, more particularly, to an improved light-emitting vehicle warning system.

2. Prior Art

The usual types of vehicle warning systems for motorcycles, cars and trucks involve light-emitting signals, front and rear road lights, and brake-activated body lights. More recently, laws have required the use of a supplemental brake light mounted on the vehicle rear window shelf for easy viewing. Bicycles are also sometimes outfitted with dry cell battery powered lights, as well as light reflective buttons and the like.

Despite the foregoing, pedestrians, bicyclists, and motorists, when approaching vehicles at oblique angles, particularly at dawn or dusk, or in the fog, dark or rain, frequently are unable to see those oncoming vehicles until they are very close and constitute a severe danger.

Accordingly, there remains a need for an improved vehicle warning system which will adequately and safely warn pedestrians, cyclists and motorists of approaching vehicles at dawn and dusk and at other hours and under other conditions, such as rain, fog, at oblique angles and the like. Such system should be simple, effective, inexpensive, durable and adaptable to a variety of forms for particular applications.

SUMMARY OF THE INVENTION

The improved vehicle warning system of the present invention satisfies all the foregoing needs. The system is substantially as set forth in the Abstract. Thus, it includes (a) a portable, electrically powered light source, such as an incandescent lamp or L.E.D. array, (b) a flexible, resilient light reflective sheet of plastic, thin metal or metal foil, reflectively coated paper or the like, preferably bearing spaced light reflective buttons, beads, strips or the like, and (c) one or more rigid or flexible support members holding the sheet next to the light source and adapated to support the assembly on a vehicle rear window shelf or exterior of a vehicle.

The light reflective sheet flutters and moves in response to vehicle vibrations and/or wind during vehicle travel. The light source is connected to the vehicle battery, or to electric dry cells or the like electric power source.

In one embodiment the support member(s) flex and vibrate to aid the sheet flutter. In another embodiment, the sheet is disposed around an incandescent lamp at the transverse midline thereof, is light reflective on the front and back thereof and is adapted to be viewed from both the front and rear of the vehicle.

Various other features of the invention are set forth in the following detailed description and accompanying drawings.

DRAWINGS

FIG. 1 is a schematic perspective view of a first preferred embodiment of the improved vehicle warning system of the present invention;

FIG. 2 is a schematic perspective view of a second preferred embodiment of the improved vehicle warning system of the present invention;

FIGS. 3 and 4 are, respectively, schematic side and front elevations of a third preferred embodiment of the improved vehicle system of the present invention;

FIG. 5 is a schematic front elevation of a fourth preferred embodiment of the improved vehicle warning system of the present invention; and, FIG. 6 is a schematic front elevation, partly broken away, of a fifth preferred embodiment of the improved vehicle warning system of the present invention.

DETAILED DESCRIPTION

FIG. 1

Now referring more particularly to FIG. 1 of the accompanying drawings, a first preferred embodiment of the invention is schematically depicted therein. Thus, system 10 is shown which comprises a light source in the form of an incandescent lamp 12 having a colored outer plastic shell 14. Lamp 12 is connected to an electrical power source (not shown) such as a vehicle battery, as by electrically conductive wires 16 which extend through a generally horizontal base support 18 and through or behind a vertical bracket 20 which holds lamp 12 above base 18.

System 10 also includes a curved, resilient, flexible, light reflective sheet 22 of plastic coated paper, cloth, thin metal or metal foil or the like which is supported directly behind lamp 12 by a spaced pair of vertical rods 24 secured to base 18. Sheet 22 extends laterally of lamp 12. If desired, sheet 22 can be directly connected to lamp 12 in order to obviate the use of rods 24. Sheet 22 bears a spaced pair of circular prism reflectors 26 of glass, plastic, metal or the like.

System 10 is adapted to be seated on the rear window shelf of a car or trunk so as to be easily viewed through various windows of the vehicle, depending on the orientation of assembly 10. Sheet 22 reflects the light from lamp 12 in many directions as sheet 22 jiggles and flutters in response to wind and vehicular vibrations during mvoement of the vehicle in which it is mounted. Thus, the reflected light can be easily seen from oblique angles and attracts the attention of pedestrians, motorists, cyclists, etc., because it shimmers and winks off and on at any given angle as sheet 22 flutters. Accordingly, system 10 amply warns against approach of the vehicle and is simple, durable, efficient and inexpensive.

Components similar to those of system 10 bear the same numerals, but are succeeded by the letter "a" in FIG. 2, the letter "b 38 in FIGS. 3 and 4, the letter "c" in FIG. 5 and the letter "d" in FIG. 6.

FIG. 2

System 10a is schematically depicted in FIG. 2. It includes incandescent lamp or L.E.D. array 12a mounted directly on sheet 22a and on a vertical support rod 20a which is very flexible and resilient so as to cause curved sheet 22a to bob and wobble, as well as flutter. Rod 20a is secured to base support 18a which receives wires 16a leading to light source 12a. Sheet 22a bears spaced light reflective tiles 26a. System 10a functions similarly to system 10.

FIGS. 3 and 4

FIGS. 3 and 4 schematically depict system 10b which is similar to system 10. Thus, system 10b includes an incandescent lamp 12b disposed in a closed, transparent, colored, circular shell 14b supported by vertical support 20b above base 18b through which wires 16b pass. Shell 14b is connected to flat sheet 22b which is disposed peripheral thereof at the transverse midplane of shell 14b and is reflective on opposite sides 28 and 30 thereof and lighted by bulb 14b on sides 28 and 30 for easy viewing both from in front and also to the rear of a vehicle carrying system 10b on the rear window shelf thereof or in another interior window location. Sheet 22b bears attractive, spaced, diagonal reflective stripes 26b of plastic, glass or the like, preferably beaded or the like, on sides 28 and 30 thereof which increase the viewability of sheet 22b. Sheet 22b flutters in the wind and in response to vehicle vibrations to scatter light from lamp 12b and thus provide the desired warning effect.

FIG. 5

A fourth preferred embodiment of the invention is schematically depicted in FIG. 5. Thus, system 10c shown therein is similar to system 10, and includes incandescent lamp 12c in a yellow shell 14c adhering directly to the center of the front face of light reflective flat, resilient, sheet 22c bearing spaced reflectors 26c. System 10c is releasably secured to the front license plate bracket 32 of a vehicle 34 by a bracket 20c. Wires 16c interconnect lamp 12c with a vehicle battery (not shown). System 10c has most of the advantages of systems 10, 10a and 10b.

FIG. 6

A fifth preferred embodiment of the improved warning system is schematically depicted in FIG. 6. Thus, system 10d is shown which is similar to systems 10, 10a and 10b. System 10d includes incandescent lamp 12d disposed in a transparent colored shell 14d and powered by dry cell batteries 36 in a casing 38 connected to lamp 12d. A rectangular frame 40 is disposed around and spaced from lamp 12d and is connected to casing 38. Frame 40 is supported in a vertical position above base 18d by a spaced pair of springs 20d, and bears reflective sheet 22d. Sheet 22 has a plurality of radiating segments 42 which flutter and wobble in the wind and due to vehicular vibration, reflecting light from lamp 12d in all directions, for early warning and easy viewing. Springs 20d aid the wobbling and other movement of sheet 22d.

Various other modifications, changes, alterations and additions can be made in the improved vehicle light warning system of the present invention, its components and their parameters. All such modifications, changes, alterations and additions as are within the scope of the appended claims form part of the present invention.

What is claimed is:

1. An improved vehicle light warning system, said system comprising, in combination:
   (a) a flexible, resilient sheet;
   (b) a plurality of light reflective means secured to the surface of said sheet and movable therewith,
   (c) said sheet having an opening therein,
   (d) a portable, electrically powered light source disposed within said opening and secured to said sheet,
   (e) said light source having a portion thereof extending above the surface of said sheet, whereby light from said light source falls upon and is reflected from said light reflective means; and
   f support means supporting said sheet and light source whereby light from said light source is reflected by said reflector means as said sheet moves in response to wind or vehicular vibration.

2. The improved vehicle warning system of claim 1 wherein said system includes means for connecting said light source to an electrical power source.

3. The improved vehicle warning system of claim 1 wherein said support means is flexible and resilient.

4. The improved vehicle warning system of claim 1 wherein said light source comprises an incandescent lamp.

5. The improved vehicle system of claim 4 wherein said sheet is disposed peripherally of said lamp.

6. An improved vehicle light warning system, said system comprising, in combination:
   (a) a portable electrically powered light source;
   (b) a flexible, resilient, light reflective sheet; and
   (c) support means securing said sheet directly adjacent to said light source for reflecting light from said light source, as said sheet moves in response to wind and vehicular vibration;
   (d) wherein said light source comprises an incandescent lamp;
   (e) wherein said sheet is disposed peripheral of said lamp;
   (f) wherein said sheet is disposed in a bracket peripheral of said lamp and includes a plurality of radiating readily moveable reflective segments.

7. The improved vehicle warning system of claim 2 wherein said electrical power source is at least one portable battery.

8. The improved vehicle warning system of claim 3 wherein said sheet and light source are connected together and said support means includes a flexible, resilient and spring-like upright member and a support base, said upright member supporting said sheet and light source above said base.

9. The improved vehicle warning system of claim 2 wherein said light source comprises an incandescent lamp supported in an upright position by said support means and wherein said sheet is supported by said support means in a position peripheral of said lamp at about the transverse axis thereof and is light reflective on opposite sides thereof for easy viewing from opposite sides thereof.

10. The improved vehicle warning system of claim 2 wherein said light source is an incandescent lamp and said support means comprises a bracket connected to said sheet and lamp and adapted to be secured to the front of a vehicle as pedestrian and vehicle warning means.

* * * * *